United States Patent
Lee (10) Patent No.: US 12,480,827 B2
(45) Date of Patent: Nov. 25, 2025

(54) DISTRIBUTED CONTINUOUS HIGH-ACCURACY BIDIRECTIONAL DISPLACEMENT FIBER-OPTIC MEASUREMENT SYSTEM AND MEASUREMENT METHOD THEREOF

(71) Applicant: SHINGINGWAY INDUSTRIAL CO., LTD., New Taipei (TW)

(72) Inventor: Jui-Ting Lee, New Taipei (TW)

(73) Assignee: Shingingway Industrial Co., Ltd., New Taipei (TW)

( * ) Notice: Subject to any disclaimer, the term of this patent is extended or adjusted under 35 U.S.C. 154(b) by 236 days.

(21) Appl. No.: 18/145,983

(22) Filed: Dec. 23, 2022

(65) Prior Publication Data
US 2023/0221195 A1 Jul. 13, 2023

(30) Foreign Application Priority Data
Jan. 7, 2022 (TW) ................... 111100778

(51) Int. Cl.
| | | |
|---|---|---|
| G01B 11/26 | (2006.01) | |
| G01B 11/02 | (2006.01) | |
| G01L 1/24 | (2006.01) | |
| G01M 5/00 | (2006.01) | |

(52) U.S. Cl.
CPC .............. *G01L 1/246* (2013.01); *G01B 11/02* (2013.01); *G01B 11/26* (2013.01); *G01L 1/247* (2013.01); *G01M 5/0041* (2013.01)

(58) Field of Classification Search
CPC . G01L 1/246; G01M 5/0041; G01D 5/35364; G01N 2021/638; G01K 11/322
See application file for complete search history.

(56) References Cited

U.S. PATENT DOCUMENTS

| | | | | |
|---|---|---|---|---|
| 10,612,911 | B1* | 4/2020 | Pena, III | G01B 11/161 |
| 2016/0116366 | A1* | 4/2016 | Da Silva | G01M 7/00 |
| | | | | 73/579 |
| 2017/0010385 | A1* | 1/2017 | Englich | G01H 9/004 |
| 2021/0396625 | A1* | 12/2021 | Masri | G08B 5/224 |

FOREIGN PATENT DOCUMENTS

| | | | | |
|---|---|---|---|---|
| EP | 1524509 A1 * | 4/2005 | ......... | G01K 11/3206 |
| WO | WO-0109565 A1 * | 2/2001 | ............. | G01B 11/18 |

\* cited by examiner

*Primary Examiner* — Maurice C Smith
(74) *Attorney, Agent, or Firm* — Rosenberg, Klein & Lee (57) ABSTRACT

The present invention discloses a distributed continuous high-accuracy bidirectional displacement fiber-optic measurement system and a measurement method thereof for measuring displacement of a measurement target, including a Brillouin analysis device connected with an optical fiber strain gauge, a fiber-optic sensor assembly including a reference fiber-optic sensor device and a plurality of fiber-optic sensor devices, and an operation module, the operation module is operable to receive the continuous data and the single-spot data transmitted from the Brillouin analysis device and the fiber-optic sensor devices, and to calculate an accurate displacement for each interval of the optical fiber strain gauge according to the continuous data and the single-spot data so as to form continuous displacement data. Thus, the present invention is economic in respect of cost and suits the need of the market application, and can be applied in a large area, and enhances the accuracy of measurement.

9 Claims, 7 Drawing Sheets

DISTRIBUTED CONTINUOUS HIGH-ACCURACY BIDIRECTIONAL DISPLACEMENT FIBER-OPTIC MEASUREMENT SYSTEM AND MEASUREMENT METHOD THEREOF

FIELD OF THE INVENTION

The present invention relates to a technical field associated with fiber-optic measurement systems and measurement methods thereof, and more particular to a distributed continuous high-accuracy bidirectional displacement fiber-optic measurement system, and a measurement method thereof, which are applicable for implementing large-area measurement and also to help improve accuracy.

BACKGROUND OF THE INVENTION

Constructions, such as roads, bridges, railways, tunnels, and environments, such as dams, or slopes, soils, and rock structures, commonly undergo deformation or displacement due to human factors or natural environment changes, so as to cause damage to the fields of such constructions or environments, and this often accompanies risks of public security. Recently, fiber-optic detection technology has been widely used in domestic and foreign academic and industrial fields, in which a fiber-optic sensor (such as fiber Bragger grating (FBG), and optic fiber strain gauge) is deployed in such fields, so that signals can be fast transmitted to a remote monitoring station to be read by an associated fiber-optic reader system n for efficient surveillance and control of on-site situations to realize a function of real-time alerting.

Figure 7:
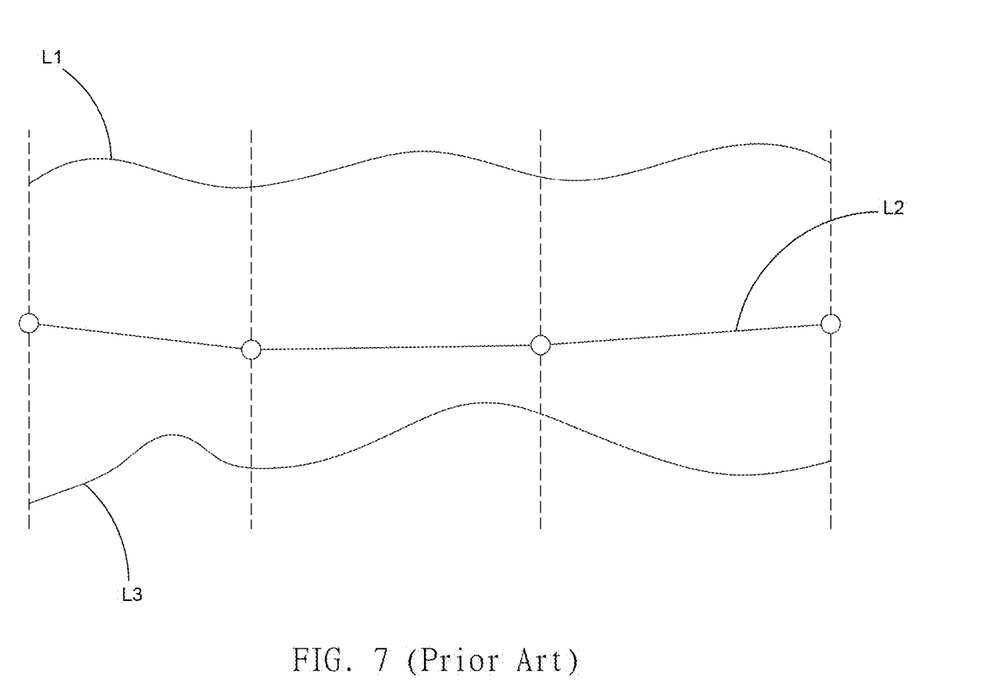
FIG. 7 a schematic view showing measurement result curves obtained with prior art fiber-optic measurement systems and a curve of actual field deformation.

However, as shown in FIG. 7, Curve L1 represents an actual field deformation curve. For monitoring conducted based on local key spots (such as deploying multiple FBG sensors in the field), for example, the circle spots of Curve L2, there will be issues of blind spots, and it is not possible to realize the situation of changes in other areas. Although deploying a massive number of sensors may help alleviate such a problem, but it is not economic. For full-distribution strain measurement (such as deploying optical fiber strain gauges in the field and analyzing or reading with a Brillouin optical time domain analyzer (BOTDA) or a Brillouin optical time domain reflectometer (BOTDR)), like Curve L3, although it is possible to measure the strain value of each spot, yet the situation of change of the field cannot be clearly and quantitatively understood, if such strain values have not been converted into data of displacement. The conversion is conducted by adopting continuous numerical integration, and error accumulation or divergence may occur if no inspection conditions of the boundary are known.

Thus, for applications to large-area and long-distance monitoring, the existing distributed strain monitoring system is not economic, does not suit the needs of market applications, and may suffer error accumulation. In view of the above, the present invention aims to provide a distributed continuous high-accuracy bidirectional displacement fiber-optic measurement system and a measurement method thereof to overcome the above deficiency of the prior art and improve the practice and uses of the industry.

SUMMARY OF THE INVENTION

The primary objective of the present invention is to provide a distributed continuous high-accuracy bidirectional displacement fiber-optic measurement system, which carries out operations on continuous data and single-spot data collected by two measurement ways of localized key-spot measurement and full-distribution strain measurement to calculate continuous displacement data that more closely approximate to actual deformation of a measured target, so that the present invention is more economic and better suits the needs for market applications, and is applicable for measurements of large areas with enhanced accuracy.

To achieve the objective, the present invention provides a distributed continuous high-accuracy bidirectional displacement fiber-optic measurement system for measuring displacement of a measurement target, comprising: a Brillouin analysis device, the Brillouin analysis device being connected with an optical fiber strain gauge, the optical fiber strain gauge being arranged in the measurement target, the Brillouin analysis device being operable to analyze a displacement of each interval of the optical fiber strain gauge to generate continuous data; a fiber-optic sensor assembly, the fiber-optic sensor assembly comprising: a reference fiber-optic sensor device, the reference fiber-optic sensor device being arranged in the measurement target, and a plurality of fiber-optic sensor devices, the fiber-optic sensor devices being arranged in the measurement target, the fiber-optic sensor devices being arranged in a same axial direction as the reference fiber-optic sensor device, the fiber-optic sensor devices being operable to individually measure a displacement with respect to the reference fiber-optic sensor device to generate single-spot data; and an operation module, the operation module being connected with the Brillouin analysis device and the fiber-optic sensor assembly, the operation module being operable to receive the continuous data and the single-spot data transmitted from the Brillouin analysis device and the fiber-optic sensor devices, and to calculate an accurate displacement for each interval of the optical fiber strain gauge according to the continuous data and the single-spot data so as to form continuous displacement data.

In the above-described distributed continuous high-accuracy bidirectional displacement fiber-optic measurement system, the displacement includes a length or an angle.

In the above-described distributed continuous high-accuracy bidirectional displacement fiber-optic measurement system, the Brillouin analysis device comprises a Brillouin optical time domain analyzer (BOTDA) or a Brillouin optical time domain reflectometer (BOTDR).

In the above-described distributed continuous high-accuracy bidirectional displacement fiber-optic measurement system, the reference fiber-optic sensor device and the fiber-optic sensor devices each comprise a fiber Bragg grating (FBG) sensor.

In the above-described distributed continuous high-accuracy bidirectional displacement fiber-optic measurement system, an analysis output module is further included, the analysis output module being operable to receive the continuous displacement data transmitted from the operation module and generate graphical data, so that a curve formed of the continuous displacement data is displayable with the graphical data.

In the above-described distributed continuous high-accuracy bidirectional displacement fiber-optic measurement system, an early-warning graphical control platform is further included, the early-warning platform being connected with the analysis output module, the early-warning graphical control platform being operable to receive the continuous displacement data and the graphical data transmitted from the analysis output module, such that when the continuous displacement data gets close to or exceeds a preset value of the early-warning graphical control platform, the early-warning graphical control platform issues a warning message.

Further, the present invention also comprises a measurement method of a distributed continuous high-accuracy bidirectional displacement fiber-optic measurement system for measuring the displacement of a measurement target, comprising: applying a Brillouin analysis device to analyze a displacement of each interval of an optical fiber strain gauge arranged in a measurement target so as to generate continuous data; applying a plurality of fiber-optic sensor devices arranged in the measurement target to individually measure a displacement with respect to a reference fiber-optic sensor device so as to generate single-spot data; and applying an operation module to calculate an actual displacement of each interval of the optical fiber strain gauge according to the continuous data and the single-spot data so as to generate continuous displacement data.

In the above-described measurement method of the distributed continuous high-accuracy bidirectional displacement fiber-optic measurement system, the operation module first conducts comparison to determine if the displacements of the fiber-optic sensor devices and the optical fiber strain gauge located on the same site of the measurement target are consistent.

In the above-described measurement method of the distributed continuous high-accuracy bidirectional displacement fiber-optic measurement system, if the displacements of the fiber-optic sensor devices and the optical fiber strain gauge at the same site of the measurement target are inconsistent, the operation module applies a distance average-weighted process to correct the continuous data for calculation of an actual displacement of each interval of the optical fiber strain gauge.

In view of the above, the present invention will be described in a more detailed way with reference to specific embodiments. The embodiments discussed below are provided as illustrative examples only, and are not intended to limit the scope of the present invention. Those skilled in the art may readily realize all the nonessential parameters and may make variations or adjustments therefor to induce substantively similar results.

DETAILED DESCRIPTION OF THE PREFERRED EMBODIMENTS

The description will be provided below for ways of embodying the present invention, with reference to FIGS. 1-6. The description is not provided for limiting the ways of embodying the present invention, and is instead an illustration of one of the embodiments of the present invention.

Figure 1:
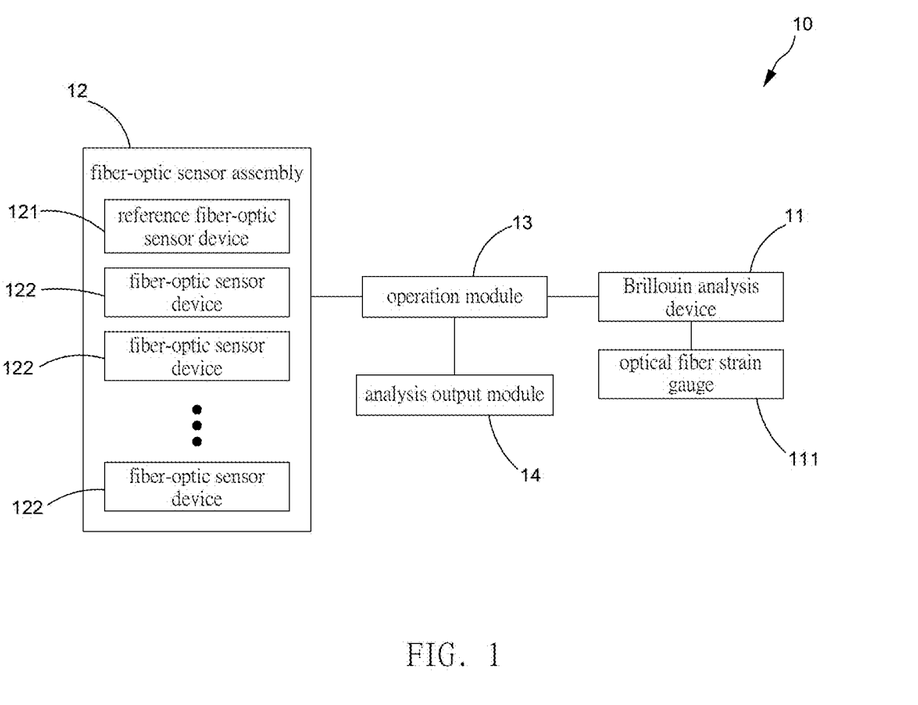
FIG. 1 is a schematic view showing the architecture of a distributed continuous high-accuracy bidirectional displacement fiber-optic measurement system according to the present invention.
Figure 2:
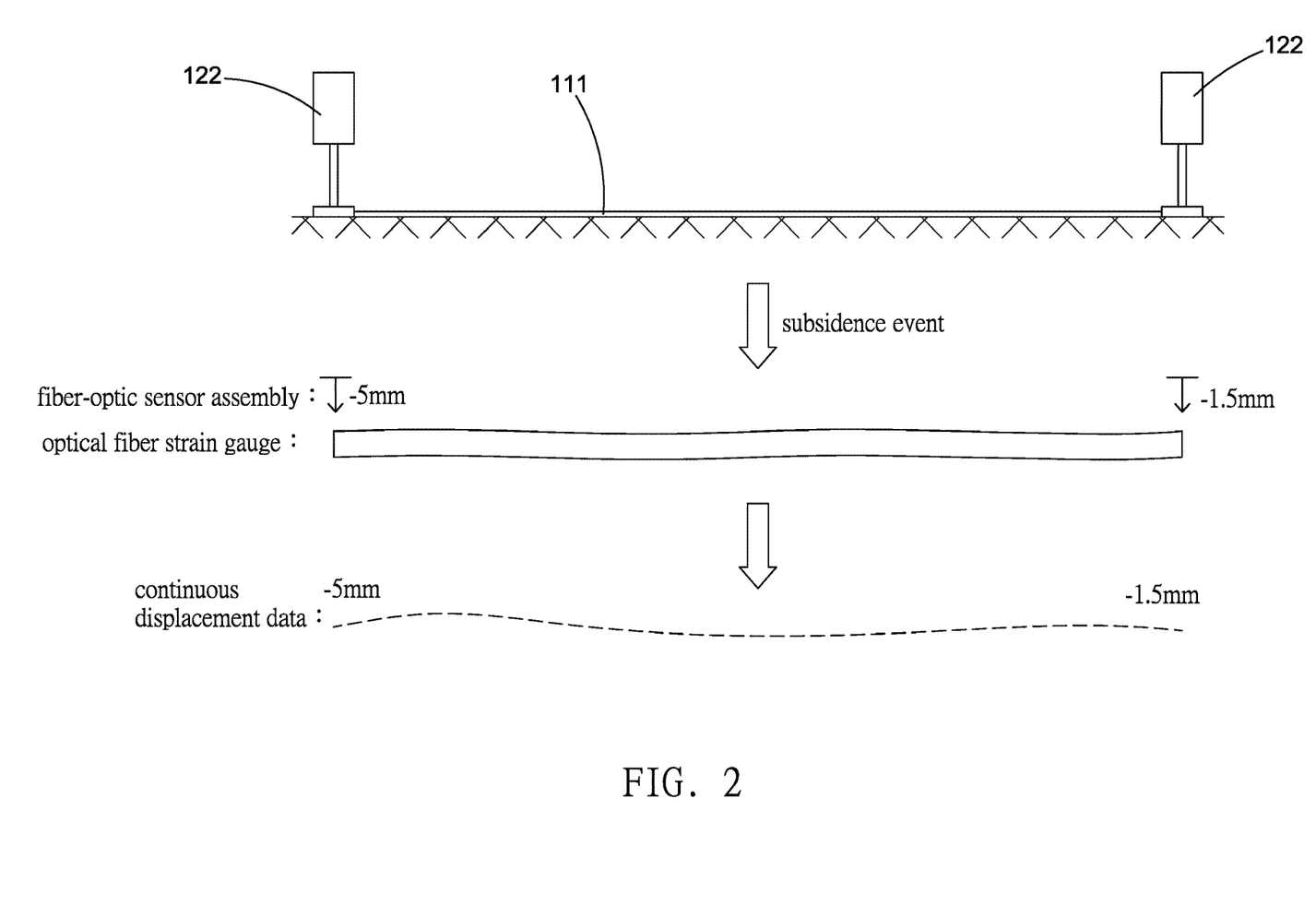
FIG. 2 is a schematic view demonstrating the concept of operation of the distributed continuous high-accuracy bidirectional displacement fiber-optic measurement system according to the present invention.
Figure 3:
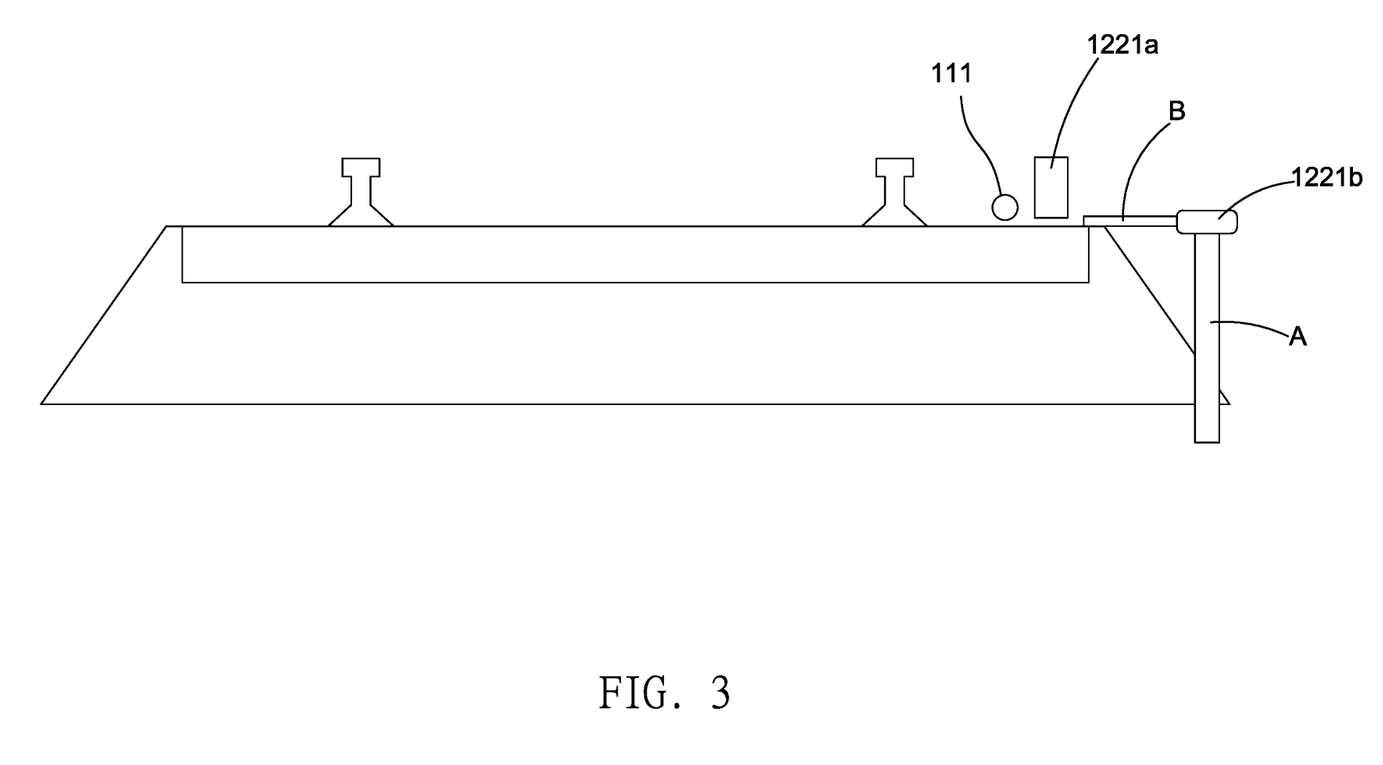
FIG. 3 is a schematic view showing the first example of the distributed continuous high-accuracy bidirectional displacement fiber-optic measurement system according to the present invention.
Figure 4:
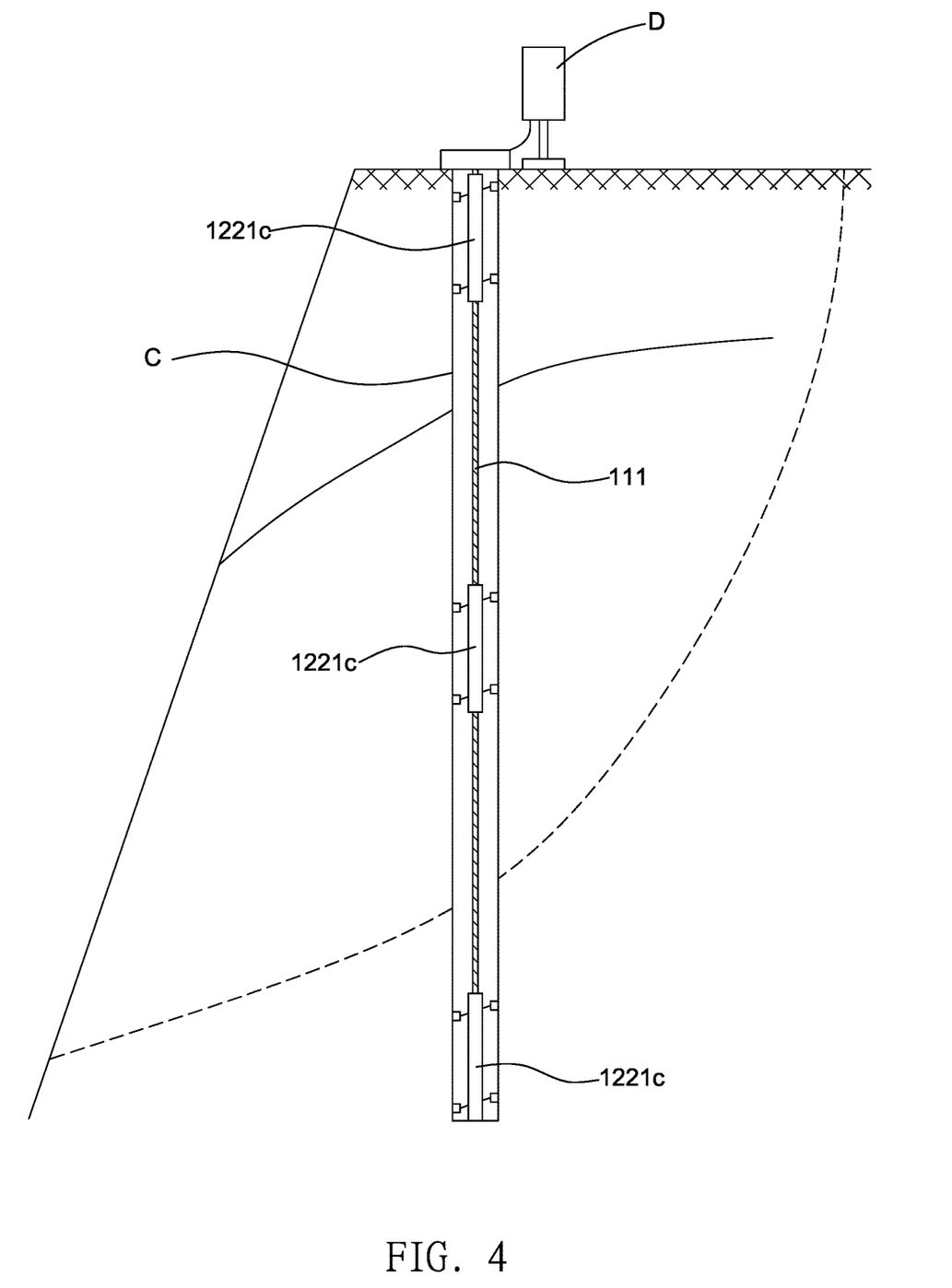
FIG. 4 is a schematic view showing a second example of the distributed continuous high-accuracy bidirectional displacement fiber-optic measurement system according to the present invention.

Firstly, referring simultaneously to FIGS. 1 and 2, the present invention provides a distributed continuous high-accuracy bidirectional displacement fiber-optic measurement system 10, which is operated to measure displacement of a measurement target and comprises: a Brillouin analysis device 11, the Brillouin analysis device 11 being connected with an optical fiber strain gauge 111, the optical fiber strain gauge 111 being arranged in the measurement target, the Brillouin analysis device 11 being operable to analyze a displacement of each interval of the optical fiber strain gauge 111 to generate continuous data; a fiber-optic sensor assembly 12, the fiber-optic sensor assembly 12 comprising: a reference fiber-optic sensor device 121, the reference fiber-optic sensor device 121 being arranged in the measurement target; and a plurality of fiber-optic sensor devices 122, the fiber-optic sensor devices 122 being arranged in the measurement target, the fiber-optic sensor devices 122 being arranged in a same axial direction as the reference fiber-optic sensor device 121, the fiber-optic sensor devices 122 being operable to individually measure a displacement with respect to the reference fiber-optic sensor device 121 to generate single-spot data; and an operation module 13, the operation module 13 being connected with the Brillouin analysis device 11 and the fiber-optic sensor assembly 12, the operation module 13 being operable to receive the continuous data and the single-spot data transmitted from the Brillouin analysis device 11 and the fiber-optic sensor devices 122, and to calculate an accurate displacement for each interval of the optical fiber strain gauge 111 according to the continuous data and the single-spot data so as to form continuous displacement data.

In the above system, the displacement designates a length or an angle; the Brillouin analysis device 11 comprises a Brillouin optical time domain analyzer (BOTDA) or a Brillouin optical time domain reflectometer (BOTDR); the reference fiber-optic sensor device 121 and the fiber-optic sensor devices 122 are each a fiber Bragg grating (FBG) sensor (which will be referred to as "FBG sensor" 1221" hereinafter), and preferably, the FBG sensor 1221 is selected according to the different type of displacement, such as FBG subsidence gauges 1221$a$, FBG displacement meters 1221$b$, and FBG slope meters 1221$c$.

In an example, as shown in FIG. 2, the fiber-optic sensor devices 122 are arranged on a ground surface at intervals of approximately 50 meters (or, the spacing interval between the fiber-optic sensor devices 122 are being adjusted according to on-site situations), and the optical fiber strain gauge 111 is deployed in a continuous manner on the ground surface between the fiber-optic sensor devices 122. The fiber-optic sensor devices 122 can be FBG subsidence gauges, and are operable to acquire single-spot data (accurate subsidence displacement) of a boundary or a checkpoint, such as a subsidence value of a left boundary being 5 mm, and a subsidence value of a right boundary being 1.5 mm, and consequently, a relative subsidence value between the two boundaries being 3.5 mm, so that strain data of successive spots can be acquired with the optical fiber strain gauge 111. Thus, by means of the conversion of related data, boundary checking, analysis and operation, the operation module 13 may monitor and eliminate influence caused by error accumulation, and obtain the subsidence values of every meter, or even every 10 cm between the two boundaries, and does not have issues of blind areas of monitoring, and is particularly applicable to a linear structure (such as a railway, a bridge, and a pipeline), and has an advantage in respect of construction cost for acquiring of continuous displacement data for accurate and timely surveillance and control of the on-site situation. Thus, referring to the schematic view of a first example shown in FIG. 3, to determine if a railway subsides or shifts, the optical fiber strain gauge 111 is laid parallel to and adjacent the railway and the FBG subsidence gauges 1221a are arranged alongside the railway and the FBG subsidence gauges 1221a mutually spaced from each other by an interval, the FBG subsidence gauges 1221a functioning to measure an amount of vertical subsidence of the railway, while an end of a fixing rod A is fixed to the ground surface and an opposite end of the fixing rod A is provided with the FBG displacement meters 1221b, and the FBG displacement meters 1221b are connected by means of a connection rod B to the railway, the FBG displacement meters 1221b functioning to measure an amount of horizontal displacement amount of the railway; or alternatively, referring to the schematic view of a second example shown in FIG. 4, to determine if a side slope involves a slipping surface that may slip, a well C is formed in the slope and an optical fiber strain gauge 111 and FBG slope meters 1221c are deployed in the well C, where the FBG slope meters 1221c detect if the well C gets inclined and the operation module 13 is operated accordingly to calculate continuous displacement data, in order to determine if such a slope includes a slipping surface, and further, the optical fiber strain gauge 111 and the FBG slope meters 1221c are connected to an optical fiber receptacle box D arranged at an opening of the well to facilitate collection of optical fiber signals from the optical fiber strain gauge 111 and the FBG slope meters 1221c.

Further, the distributed continuous high-accuracy bidirectional displacement fiber-optic measurement system 10 according to the present invention further comprises an analysis output module 14. The analysis output module 14 is operable to receive the continuous displacement data transmitted from the operation module 13 and generate graphical data, such that the graphical data may be applied to display a curve (as shown in FIG. 2) formed of the continuous displacement data.

An early-warning graphical control platform (not shown) may be additionally included. The early-warning platform is connected to the analysis output module, and the early-warning graphical control platform is operable to receive the continuous displacement data and the graphical data transmitted from the analysis output module. When the continuous displacement data gets close to or exceeds a preset value of the early-warning graphical control platform, the early-warning graphical control platform issues a warning message.

Finally, referring simultaneously to FIGS. 1-6, the present invention further comprises a measurement method of a distributed continuous high-accuracy bidirectional displacement fiber-optic measurement system for measuring a displacement of a measurement target, comprising: Step S11: applying a Brillouin analysis device 11 to analyze a displacement of each interval of an optical fiber strain gauge 111 arranged in a measurement target so as to generate continuous data; Step S12: applying a plurality of fiber-optic sensor devices 122 arranged in the measurement target to individually measure a displacement with respect to a reference fiber-optic sensor device 121 so as to generate single-spot data; and Step S2: applying an operation module 13 to calculate an actual displacement of each interval of the optical fiber strain gauge 111 according to the continuous data and the single-spot data so as to generate continuous displacement data.

Figure 5:
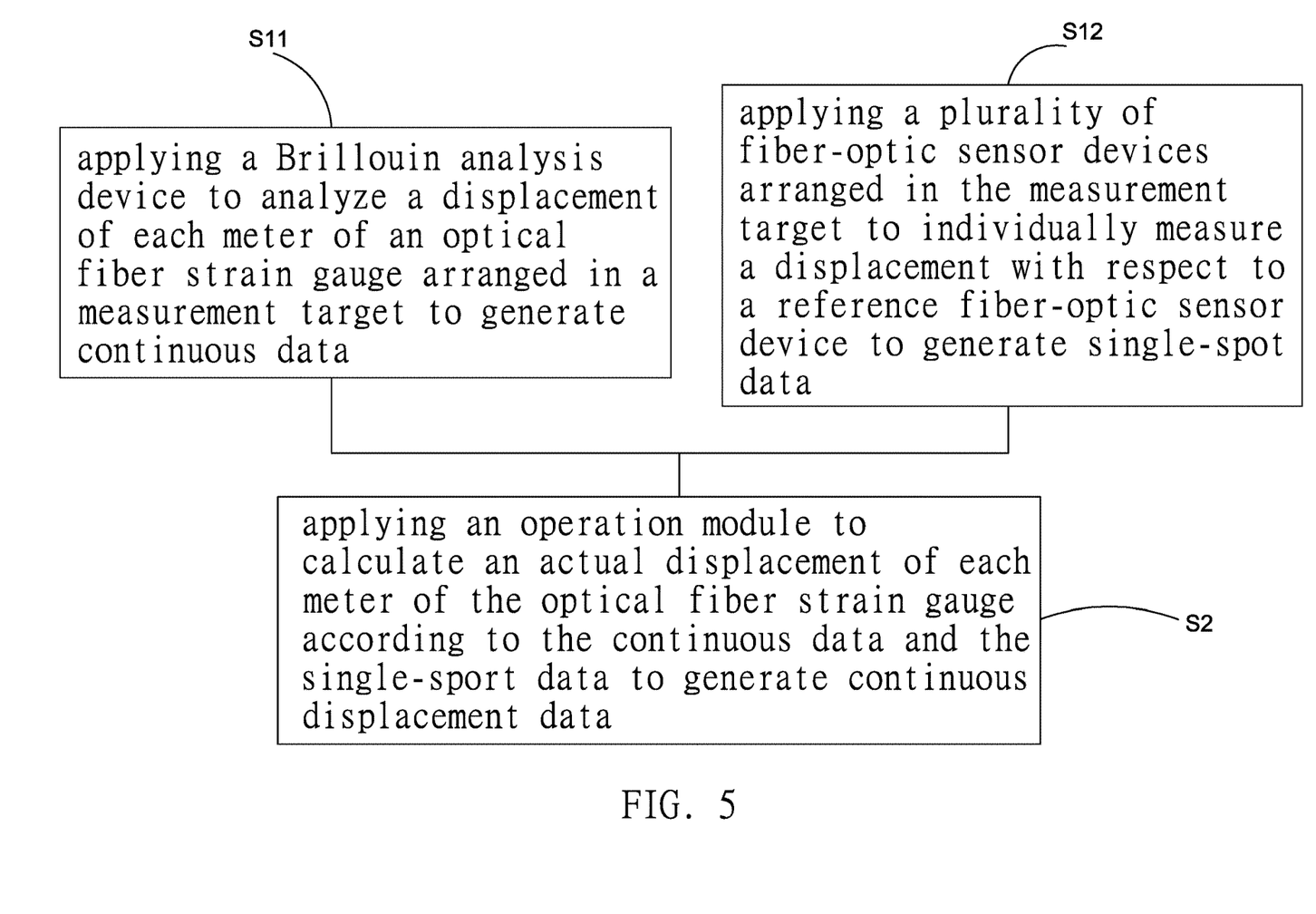
FIG. 5 is a flow chart showing a measurement method implemented with the distributed continuous high-accuracy bidirectional displacement fiber-optic measurement system according to the present invention.

In the method, operation module 13 first determines, through comparison, if the displacements of the fiber-optic sensor devices 122 and the optical fiber strain gauge 111 at the same site of the measurement target are consistent. Then, if the displacements of the fiber-optic sensor devices 122 and the optical fiber strain gauge 111 at the same site of the measurement target are inconsistent, the operation module 13 applies a distance average-weighted process to correct the continuous data for calculation of the actual displacement of each interval of the optical fiber strain gauge 111.

However, with regard to the acquisition of the strain data of the optical fiber strain gauge 111, the Brillouin measurement principle is adopted. The Brillouin analysis device 11, which can be a BOTDA or a BOTDR, supplies an input of pulsed light into the optical fiber. When the optical fiber is acted upon by an external force or a temperature, a variation of the Brillouin frequency thereof is of a linear relationship with respect to a strain induced in the optical fiber. The displacement of any spot on the optical fiber strain gauge 111 can be determined according to the flexure displacement equation of the mechanics of material. With two optical fibers, respectively on the upper side and the lower side, adhesively fixed to the optical fiber strain gauge 111, the strain of the optical fiber strain gauge 111 on each spot thereof induced by an external force and temperature may be obtained. However, the strains induced by temperature are of the same value and thus, the amounts of the strains induced by temperature can be canceled out by subtraction. Mathematic integration is then applied to obtain the displacement of each spot of the optical fiber strain gauge 111.

Further, the FBG sensor 1221 is taken as an example of the fiber-optic sensor devices 122, and the mechanism of measurement of the FBG sensor 1221 involves an internal mechanism that drives the FBG to deform, so as to causes a variation of FBG wavelength, and the displacement can be obtained with a related calibration coefficient. On the same optical fiber line, sensors of different FBG wavelengths can be connected in cascade and FBG reading equipment is applied to measure FBG reflection signals so as to obtain the FBG wavelengths.

Thus, based on the principle discussed above, an operation procedure of operation module 13 will be described below:

The FBG sensor 1221 is provided with two fiber gratings, wherein the reading of the FBG sensor 1221, $D_n$, can be calculated with equation 1:

$$D_n = [(FBG_2 - FBG_1)_c - (FBG_2 - FBG_1)_0] \times Cal_n \qquad \text{equation 1}$$

where $(FBG_2 - FBG_1)_c$ denotes a difference between the two fiber gratings at a given moment; $(FBG_2 - FBG_1)_0$ denotes an initial difference between the two fiber gratings when the FBG sensor 1221 is established; and Calm is a corresponding calibration parameter.

For continuous displacement monitoring, the displacement for the FBG sensor 1221 on a reference line, and the displacement of the optical fiber strain gauge 111 corresponding thereto are both zero, i.e., $\delta_0=0$ and $\omega_0=0$.

The displacements of the FBG sensors 1221 other than that on the reference line can be calculated with equation 2:

$$\delta_n = D_n - D_0 \; n \neq 0 \text{ and } \delta_0 = 0 \qquad \text{equation 2}$$

For the optical fiber strain gauge 111, the displacement of each meter can be calculated with equation 3:

$$\omega(z) = \int\int_0^z \frac{\overline{\varepsilon_{up}(z)} - \overline{\varepsilon_{down}(z)}}{D} dzdz + az + b \qquad \text{equation 3}$$

where $\overline{\varepsilon_{up}(z)} = \varepsilon_{up} + \Delta\varepsilon_T(z)$ indicates strain of any interval on an upper surface of the optical fiber strain gauge 111; $\overline{\varepsilon_{down}(z)} = \varepsilon_{down} + \Delta\varepsilon_T(z)$ indicates strain of any interval on a lower surface of the optical fiber strain gauge 111, and z indicates an axial direction of the optical fiber strain gauge 111.

To improve the accuracy of successive calculation, the measurement system of the present invention adopts a combination of a partial distribution arrangement of the FBG sensors 1221 and a distributed arrangement of the optical fiber strain gauge 111, in which the FBG sensors 1221 function as boundary checkpoints of the measurement system for the purposes of increasing the accuracy of the system and correction of errors.

Figure 6:
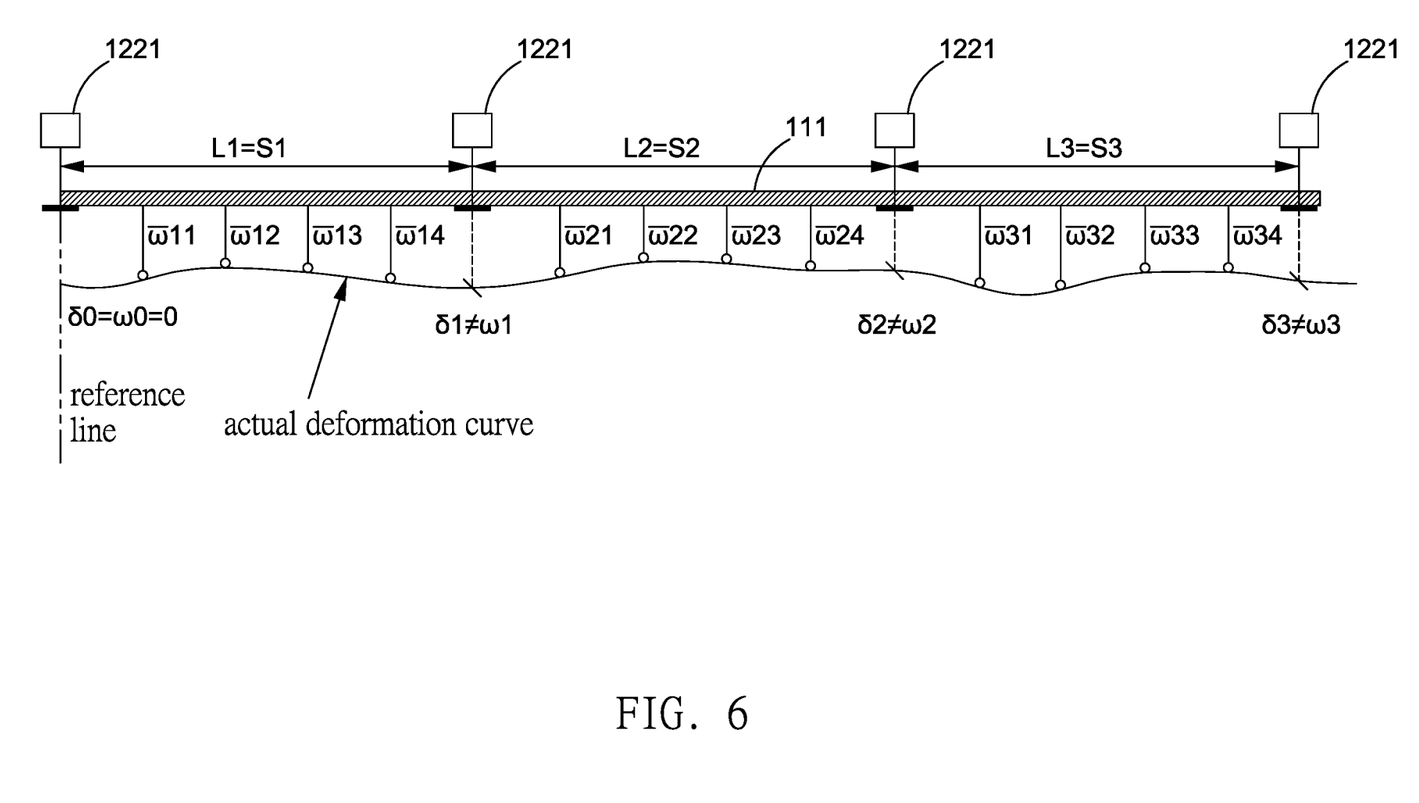
FIG. 6 is a reference diagram of the distributed continuous high-accuracy bidirectional displacement fiber-optic measurement system according to the present invention.

As shown in FIG. 6, when the interval distance L of the FBG sensors 1221 deployed at intervals is consistent with a length S of the optical fiber strain gauge 111, a comparison of the displacements of the two can be implemented with equation 4 to obtain a deviation Ei:

$$\varepsilon_i = \delta_i - \omega_i, \; i \neq 0 \qquad \text{equation 4}$$

Finally, a distance average-weighted operation is applied, such as equations 5 and 6, to correct the displacement of each meter of each interval of the optical fiber strain gauge 111, wherein the length S is far greater than one meter and the interval distance L is scheduled as being a multiple of 10 meters, so as to obtain the continuous displacement data that are very close to an actual deformation curve:

$$(\varpi_{ij})_{cor} = \varpi_{ij} - \varepsilon_i \times \frac{s_j}{L_i} \times j \; i \neq 0; j \neq 0 \text{ and } S_i = L_j \qquad \text{equation 5}$$

$$(\omega_{ij})_{cor} = \omega_{ij} - \varepsilon_i \times \frac{s_j}{L_i} \; i \neq 0 \text{ and } S_i = L_j \qquad \text{equation 6}$$

Thus, the present invention provides a distributed continuous high-accuracy bidirectional displacement fiber-optic measurement system and a measurement method thereof, in which continuous data and single-spot data collected through two measurement operations of localized key-spot measurement and full-distribution strain measurement are subjected to operations to calculate continuous displacement data that are relatively close to actual deformation of a measurement target, so that the present invention is economic in respect of cost and suits the need of the market application, and can be applied in a large area and enhances the accuracy of measurement.

The description provided above illustrates only preferred examples of the embodiment of the present invention, and should not be construed as limiting to the scope of the embodiment of the present invention. Equivalent variations and modifications that are easily inferred from the contents of the claims and the disclosure of the present invention are considered failing in the scope of the present invention as defined by the attached claims.

What is claimed is:

1. A distributed continuous high-accuracy bidirectional displacement fiber-optic measurement system for measuring the displacement of a measurement target, comprising:
   a Brillouin analysis device, the Brillouin analysis device being connected with an optical fiber strain gauge, the optical fiber strain gauge being arranged in the measurement target, the Brillouin analysis device being operable to analyze a displacement of each interval of the optical fiber strain gauge to generate continuous data;
   a fiber-optic sensor assembly, the fiber-optic sensor assembly comprising:
   a reference fiber-optic sensor device, the reference fiber-optic sensor device being arranged in the measurement target, and
   a plurality of fiber-optic sensor devices, the fiber-optic sensor devices being arranged in the measurement target, the fiber-optic sensor devices being arranged in a same axial direction as the reference fiber-optic sensor device, the fiber-optic sensor devices being operable to individually measure a displacement with respect to the reference fiber-optic sensor device to generate single-spot data; and
   an operation module, the operation module being connected with the Brillouin analysis device and the fiber-optic sensor assembly, the operation module being operable to receive the continuous data and the single-spot data transmitted from the Brillouin analysis device and the fiber-optic sensor devices, and to calculate an accurate displacement for each interval of the optical fiber strain gauge according to the continuous data and the single-spot data so as to form continuous displacement data.

2. The distributed continuous high-accuracy bidirectional displacement fiber-optic measurement system as defined in claim 1, wherein the displacement includes a length or an angle.

3. The distributed continuous high-accuracy bidirectional displacement fiber-optic measurement system as defined in claim 1, wherein the Brillouin analysis device comprises a Brillouin optical time domain analyzer (BOTDA) or a Brillouin optical time domain reflectometer (BOTDR).

4. The distributed continuous high-accuracy bidirectional displacement fiber-optic measurement system as defined in claim 1, wherein the reference fiber-optic sensor device and the fiber-optic sensor devices each comprise a fiber Bragg grating (FBG) sensor.

5. The distributed continuous high-accuracy bidirectional displacement fiber-optic measurement system as defined in claim 1, further comprising an analysis output module, the analysis output module being operable to receive the continuous displacement data transmitted from the operation module and generate graphical data, so that a curve formed of the continuous displacement data is displayable with the graphical data.

6. The distributed continuous high-accuracy bidirectional displacement fiber-optic measurement system as defined in claim 5, further comprising an early-warning graphical control platform, the early-warning platform being the connected with the analysis output module, early-warning graphical control platform being operable to receive the continuous displacement data and the graphical data transmitted from the analysis output module, such that when the continuous displacement data gets close to or exceeds a preset value of the early-warning graphical control platform, the early-warning graphical control platform issues a warning message.

7. A measurement method of a distributed continuous high-accuracy bidirectional displacement fiber-optic measurement system for measuring displacement of a measurement target, comprising:
  applying a Brillouin analysis device to analyze a displacement of each interval of an optical fiber strain gauge arranged in a measurement target so as to generate continuous data;
  applying a plurality of fiber-optic sensor devices arranged in the measurement target to individually measure a displacement with respect to a reference fiber-optic sensor device so as to generate single-spot data; and
  applying an operation module to calculate an actual displacement of each interval of the optical fiber strain gauge according to the continuous data and the single-spot data so as to generate continuous displacement data.

8. The measurement method of the distributed continuous high-accuracy bidirectional displacement fiber-optic measurement system as defined in claim 7, wherein the operation module first conducts comparison to determine if the displacements of the fiber-optic sensor devices and the optical fiber strain gauge located on a same site of the measurement target are consistent.

9. The measurement method of the distributed continuous high-accuracy bidirectional displacement fiber-optic measurement system as defined in claim 8, wherein if the displacements of the fiber-optic sensor devices and the optical fiber strain gauge at the same site of the measurement target are inconsistent, the operation module applies a distance average-weighted process to correct the continuous data for calculation of an actual displacement of each interval of the optical fiber strain gauge.

* * * * *